(12) United States Patent
Schulman et al.

(10) Patent No.: US 7,429,842 B2
(45) Date of Patent: Sep. 30, 2008

(54) CONTROL AND ALARM SYSTEM FOR SUMP PUMP

(75) Inventors: Alan M. Schulman, 3 Foxtail La., Riverwoods, IL (US) 60015; James W. Oram, Charlotte, NC (US)

(73) Assignee: Alan M. Schulman, Riverwoods, IL (US)

( * ) Notice: Subject to any disclaimer, the term of this patent is extended or adjusted under 35 U.S.C. 154(b) by 300 days.

(21) Appl. No.: 11/303,799

(22) Filed: Dec. 16, 2005

(65) Prior Publication Data

US 2006/0176000 A1 Aug. 10, 2006

(51) Int. Cl.
*H02P 3/00* (2006.01)

(52) U.S. Cl. .................. 318/482; 318/139; 417/18; 417/36

(58) Field of Classification Search .......... 318/482, 318/139, 727; 417/18, 36, 40
See application file for complete search history.

(56) References Cited

U.S. PATENT DOCUMENTS

| | | | |
|---|---|---|---|
| 3,887,733 A * | 6/1975 | Tolliver et al. ............. 427/444 |
| 3,932,853 A | 1/1976 | Cannon | |
| 3,992,130 A | 11/1976 | Childress | |
| 4,196,325 A | 4/1980 | Povilaitis | |
| 4,222,711 A | 9/1980 | Mayer | |
| 4,255,747 A | 3/1981 | Bunia | |
| 4,309,157 A | 1/1982 | Niedermeyer | |
| 4,369,438 A | 1/1983 | Wilhelmi | |
| 4,456,432 A | 6/1984 | Mannino | |
| 4,626,755 A | 12/1986 | Butcher et al. | |
| 4,894,496 A | 1/1990 | Palumbo | |
| 5,015,152 A * | 5/1991 | Greene ............... 417/40 |
| 5,135,359 A | 8/1992 | Defresne | |
| 5,216,288 A * | 6/1993 | Greene ............... 307/118 |
| 5,297,939 A | 3/1994 | Orth et al. | |
| 5,672,050 A * | 9/1997 | Webber et al. ........... 417/18 |
| 5,705,747 A * | 1/1998 | Bailey ................. 73/290 R |
| 5,860,790 A * | 1/1999 | Wang ................. 417/32 |
| 6,139,281 A | 10/2000 | Schooler | |
| 6,149,390 A | 11/2000 | Fisher et al. | |
| 6,188,200 B1 | 2/2001 | Maiorano | |
| 6,375,430 B1 | 4/2002 | Eckert et al. | |
| 6,461,114 B1 | 10/2002 | Lin | |
| 6,462,666 B1 | 10/2002 | Einck | |
| 6,474,952 B1 | 11/2002 | Fisher et al. | |
| 6,676,382 B2 * | 1/2004 | Leighton et al. .......... 417/40 |

* cited by examiner

*Primary Examiner*—Rina I Duda
(74) *Attorney, Agent, or Firm*—Nixon Peabody LLP

(57) ABSTRACT

A control system for a sump pump driven by an AC motor includes an AC power line having an input adapted for connection to an AC power source and an output adapted for connection to the AC drive motor. A controller is connected to a controllable switch in the AC power line, to control the opening and closing of that switch. Redundant float switches are coupled to the controller and adapted to be mounted in a sump to supply the controller with a signals when the liquid in the sump rises to a selected level. A timer in, or coupled to, the controller alters the control signal to open the controllable switch if the liquid level in the sump remains above the selected level for a preselected time period.

20 Claims, 8 Drawing Sheets

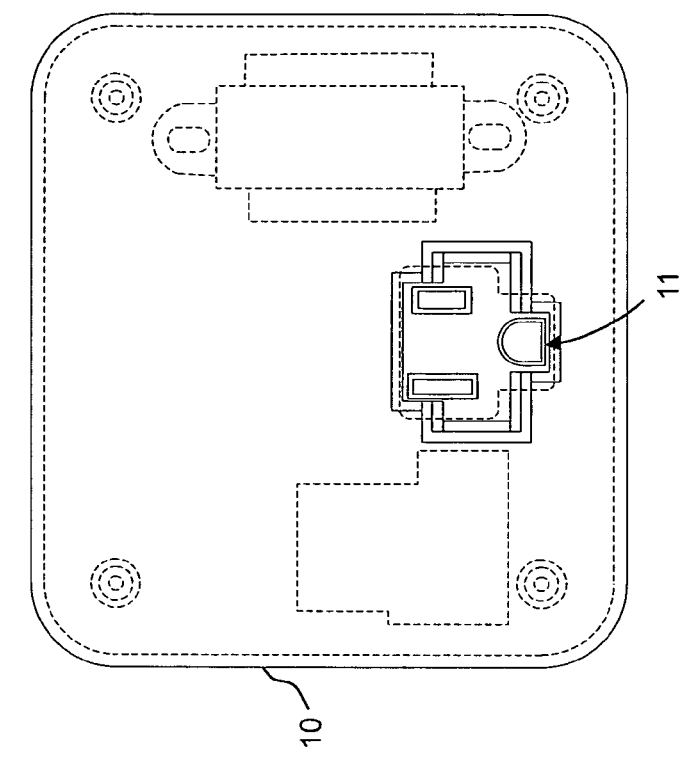
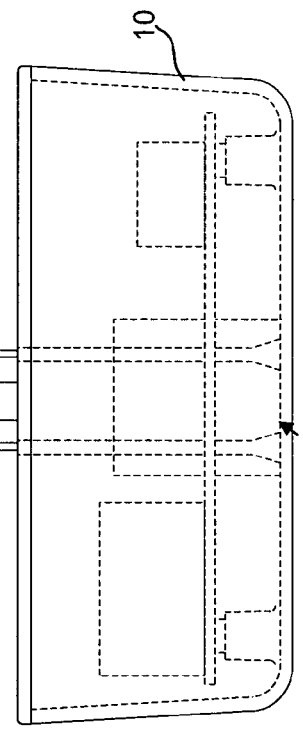
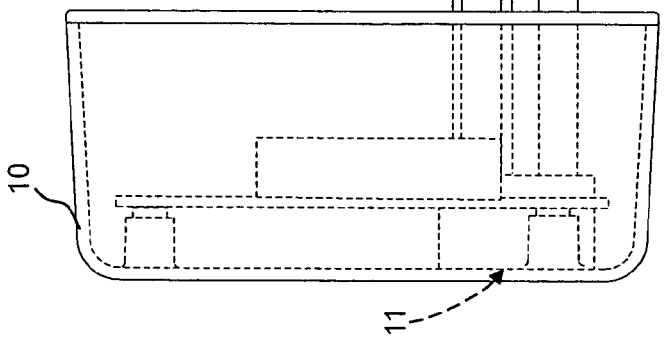
FIG. 3
FIG. 2
FIG. 1

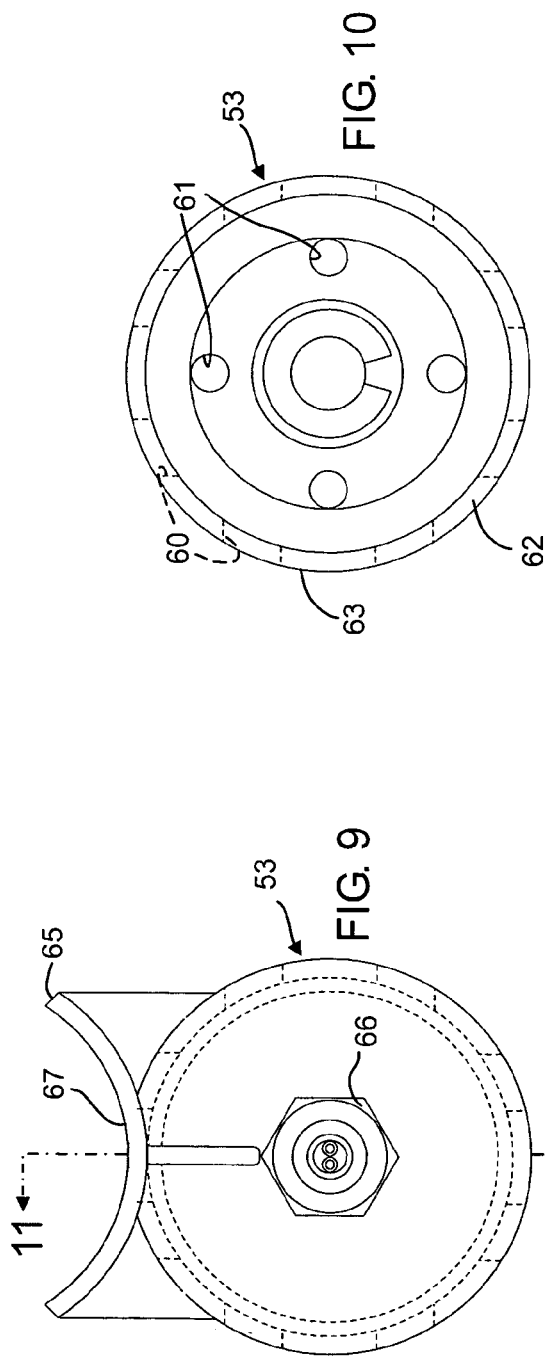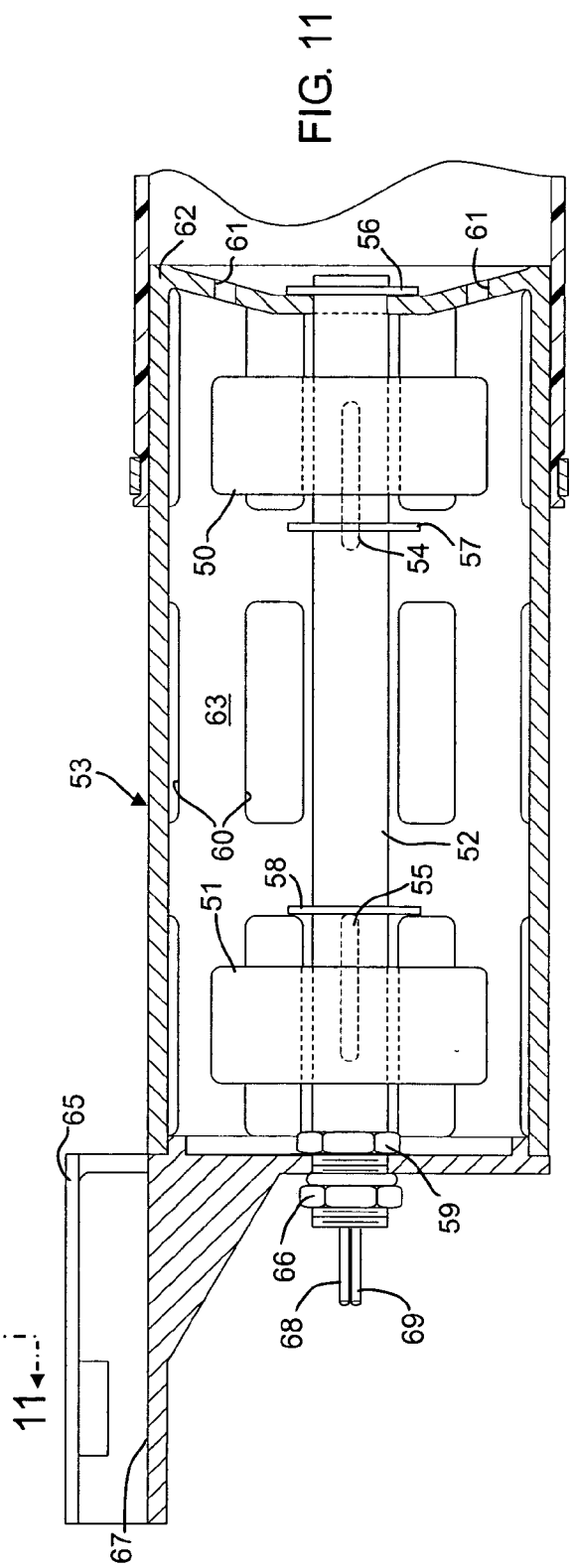

CONTROL AND ALARM SYSTEM FOR SUMP PUMP

FIELD OF THE INVENTION

The present invention relates to control and alarm systems for sump pumps driven by electric motors.

SUMMARY OF THE INVENTION

In accordance with one embodiment of the present invention, a control system for a sump pump driven by an AC motor comprises an AC power line having an input adapted for connection to an AC power source and an output adapted for connection to the AC drive motor, a controllable switch in the AC power line, a controller coupled to the controllable switch to supply a control signal to the controllable switch to control the supply of power to the drive motor, and redundant float switches each of which is coupled to the controller and adapted to be mounted in a sump to supply the controller with a signal when the liquid in the sump rises to a selected level.

A timer may be included for producing an alarm signal when the drive motor has been energized continuously for a preselected time period. A connector may be included for supplying the alarm signal to an alarm system, which may be an alarm system installed in the building in which the sump pump is installed or any security system capable of receiving such a signal via a communication link. A backup battery may supply power to the controller when power is not available from the AC power line, with a monitor coupled to the battery for producing an alarm signal when the output voltage of the battery drops below a preselected level. Another monitor may be coupled to the AC power line for producing a battery control signal when power is not available from the AC power line, with a controllable switch responding to the battery control signal for connecting the battery to the controller. A monitor may also be coupled to the AC power line for producing an alarm signal when power is not available from the AC power line or when a brown-out (e.g., line voltage drops below 90 volts).

An improved dual-float-switch assembly has redundant float switches that include a pair of spaced floats mounted for vertical movement with each of the floats containing at least one magnetic element, a pair of spaced switches mounted for actuation by the magnetic elements when the floats are moved to selected locations relative to the switches, an electrical power source connected to the switches so that the actuation of the switches produces electrical output signals indicating the locations of the floats relative to the switches, and an apertured container surrounding the floats to allow vertical movement of the floats in the sump while restricting the access of obstructing particles to the path of vertical movement of the floats. The apertured container may comprise a generally cylindrical cage surrounding floats that are generally disc-shaped for movement along the axis of the interior of the cage.

BRIEF DESCRIPTION OF THE DRAWINGS

FIG. 1 is a side elevation of one embodiment of a sump pump control unit embodying the invention;

FIG. 2 is a bottom plan view of the control unit of FIG. 1;

FIG. 3 is a front elevation of the control unit of FIG. 1;

FIG. 9 is an enlarged end elevation of the left-hand end of the float valve assembly as viewed in FIG. 8;

FIG. 10 is an enlarged end elevation of the right-hand end of the float valve assembly as viewed in FIG. 8;

FIG. 11 is a longitudinal section of the float valve assembly of FIGS. 8-10.

DETAILED DESCRIPTION OF ILLUSTRATED EMBODIMENTS

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Figure 6:
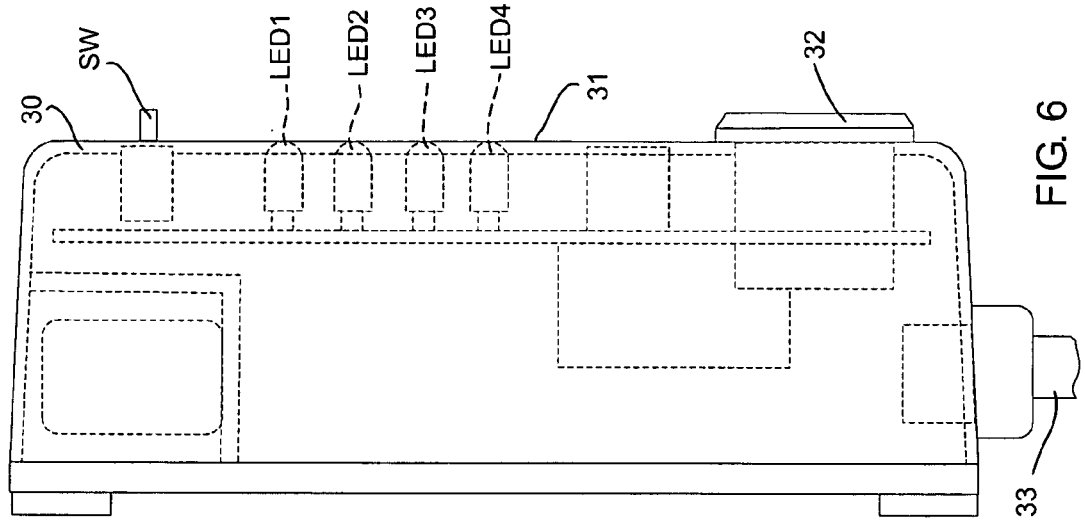
FIG. 6 is a side elevation of the control unit of FIG. 5.

Two embodiments of the invention will be described. A first embodiment, shown in FIGS. 1-4, is a low-cost embodiment that does not use a microprocessor. A second embodiment, shown in FIGS. 5-7, is a more fully featured embodiment that uses a microprocessor. A dual-float-switch assembly that can be used in either of the two embodiments is shown in FIGS. 8-12.

The embodiment of FIGS. 1-4 includes a housing 10 that contains control circuitry without any indicators or alarms. The power cord of a sump pump having an AC drive motor is plugged into a socket 11 on the front of the housing 10, and a "piggyback" plug 12 extending outwardly from the back of the housing 10 is plugged into a standard power outlet to supply power to both the control circuitry inside the housing 10 and to the pump controlled by that circuitry.

Figure 4:
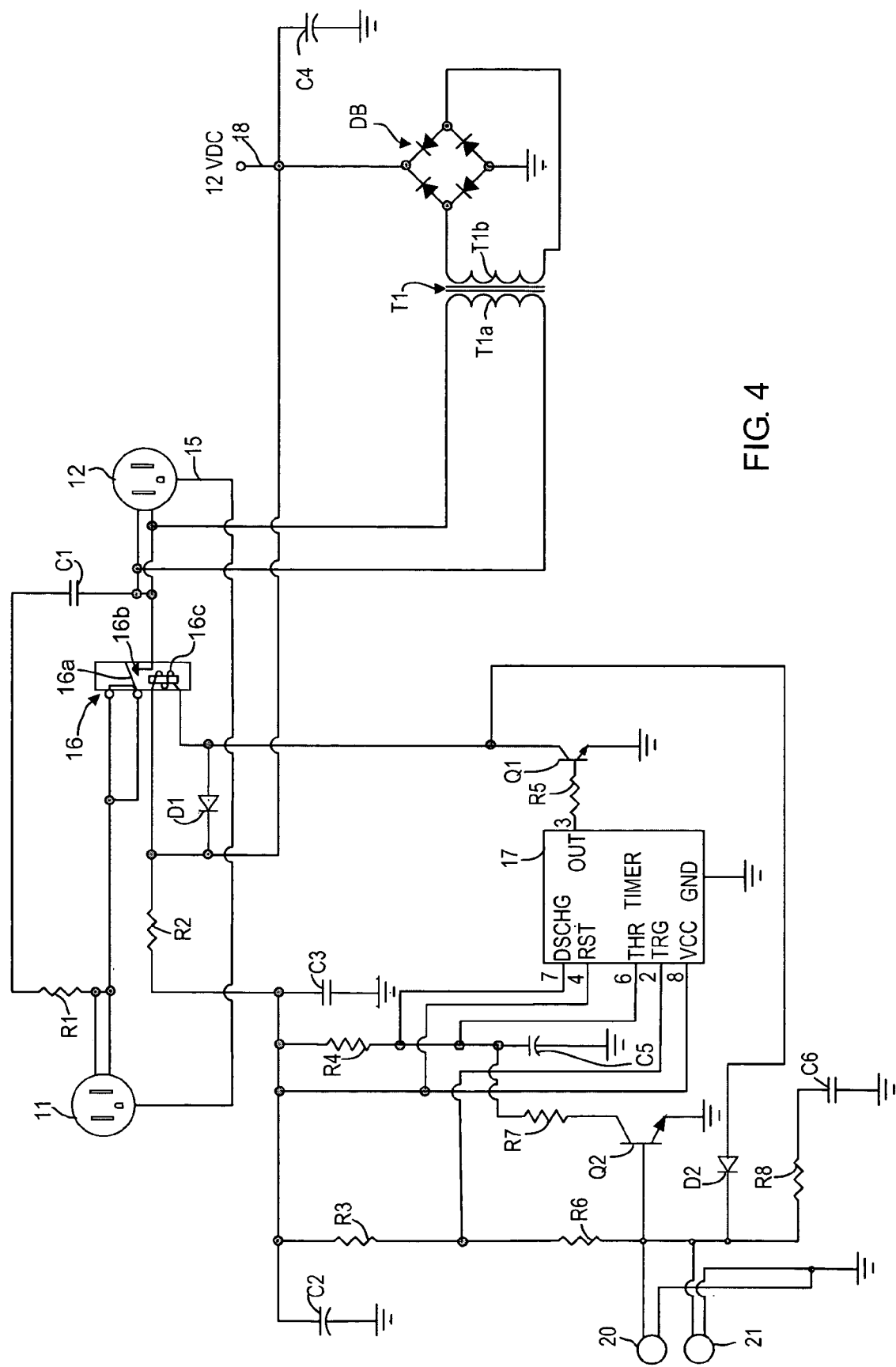
FIG. 4 is a schematic circuit diagram of the electrical circuitry in the control unit of FIG. 1.
Figure 5:
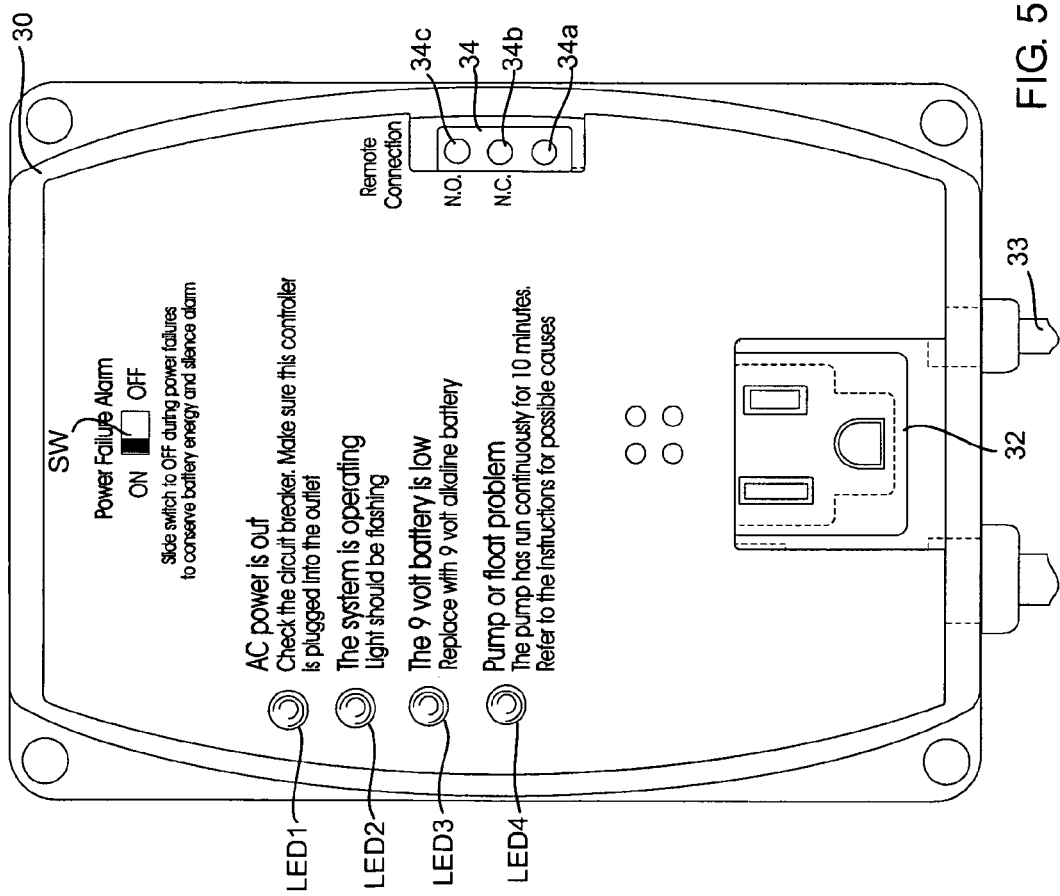
FIG. 5 is a front elevation of another embodiment of a sump pump control unit embodying the invention.

A schematic diagram of the control circuitry inside the housing 10 is shown in FIG. 4. The socket 11 and the plug 12 have a common ground line 15. Connection of the pump drive motor to the AC power source is controlled by opening and closing the contacts 16a, 16b of a relay 16 having a coil 16c, the energization of which is controlled by a transistor Q1 that has its emitter and collector connected in series with the coil 16c. Any AC spikes produced by the opening and closing of the relay contacts 16a, 16b are eliminated, or at least reduced, by a snubber circuit formed by a resistor R1 and a capacitor C1 connected across the relay contacts. A diode D1 acts as a ring-back snubber to prevent damage to the transistor Q1 when the pump is turned off.

A timer 17, such as a NE555 IC, is connected via resistor R5 to the base of the transistor Q1 to turn the transistor Q1 on and off in response to an output signal from either of two float switches 20 and 21 located within the sump containing the sump pump. The transistor Q1 in turn controls the energization of the relay coil 16 to turn the drive motor on and off. The float switches 20 and 21 are positioned to be actuated when the liquid level in the sump rises to a selected level at which it is desired to start the sump pump. The two float switches 20 and 21 are connected in parallel with each other so that they are redundant, which ensures that the timer 17 receives an input signal from the float switches even if one of those switches malfunctions. Malfunctioning of float switches is one of the primary causes of failures of sump pump systems.

Both float switches 20 and 21 are connected between a 12-volt DC voltage supply 18 and ground. A voltage divider formed by a pair of resistors R3 and R6 is connected between the 12-volt supply and the float switches, with the mid-point of the voltage divider connected to the triggering input TRG of the timer 17 at pin 2. Thus, when one or both of the float switches 20 and 21 close, the voltage at the input TRG of the timer 17 falls, which causes the timer to produce an output signal at pin 3. This output signal passes through the resistor R5 to the base of the transistor Q1, which turns on the transistor, causing current to flow from the 12-volt supply though the relay coil 16 and the transistor Q1 to ground. Consequently, whenever the transistor Q1 is on, the relay coil 16 is energized, which closes the relay contacts 16a, 16b to turn on the drive motor for the sump pump by supplying power from the plug 12 to the socket 11 connected to the power cord of the drive motor. Conversely, when the transistor Q1 is turned off, the relay coil 16 is de-energized, the relay contacts 16a, 16b are opened, and the drive motor is turned off. A diode D4 is connected between the float switches and the collector of the transistor Q1 to keep the pump motor operating in the event of a failure of the timer 17.

Both float switches 20 and 21 are also connected to the base of a transistor Q2 which has its collector connected to ground and its emitter to an RC timing circuit formed by a resistor R4 and a capacitor C5. The transistor Q2 keeps the capacitor C5 discharged while either or both float switches are closed, i.e., while the sump pump is on. When the liquid level in the sump drops to open the float switches, the timer 17 maintains its output signal for 10 seconds to keep the pump on for this additional time period, and then turns the pump off by turning off the transistor Q1. A resistor R8 and capacitor C6 connected in series between the base of transistor Q2 and ground form a noise snubber to remove noise from the float switch lines.

The power input to the timer 17 is the 12-volt supply connected to the Vcc input of the timer at pin 8. A filter formed by a resistor R2 and capacitors C2 and C3 filter noise in the 12-volt supply line to maintain operation of the timer 17 with filtered voltage.

The 12-volt supply is preferably derived from the AC power source connected to the plug 12. That power source is connected across the primary winding T1a of a step-down transformer T1. The secondary winding T1b of the transformer T1 is connected to a full-wave rectifier formed by a diode bridge DB to convert the reduced AC voltage from the secondary winding T1b to the desired 12 volts DC A capacitor C4 smoothes the DC output of the bridge DB.

The more fully featured embodiment of FIGS. 5-7 includes a housing 30 that not only contains control circuitry, but also multiple indicator lights LED1-LED4 (described in detail below) on its front panel 31. The power cord of a sump pump having an AC drive motor is plugged into a socket 32 in the front panel 31, and a short power cord 33 extending from the bottom wall of the housing 30 is plugged into a standard power outlet to supply power to both the control circuitry inside the housing 30 and to the pump controlled by that circuitry, via the pump power cord plugged into the socket 32. The front panel 31 also includes a connector 34 for supplying signals (described in detail below) to an alarm system, which may be an alarm system installed in the building in which the sump pump is installed or any security system capable of receiving such a signal via a communication link. in which the sump pump is installed, and an on-off switch SW1 that permits the power-failure alarm (also described in detail below) to be turned off manually to silence the alarm and to conserve battery power.

Figure 7A:
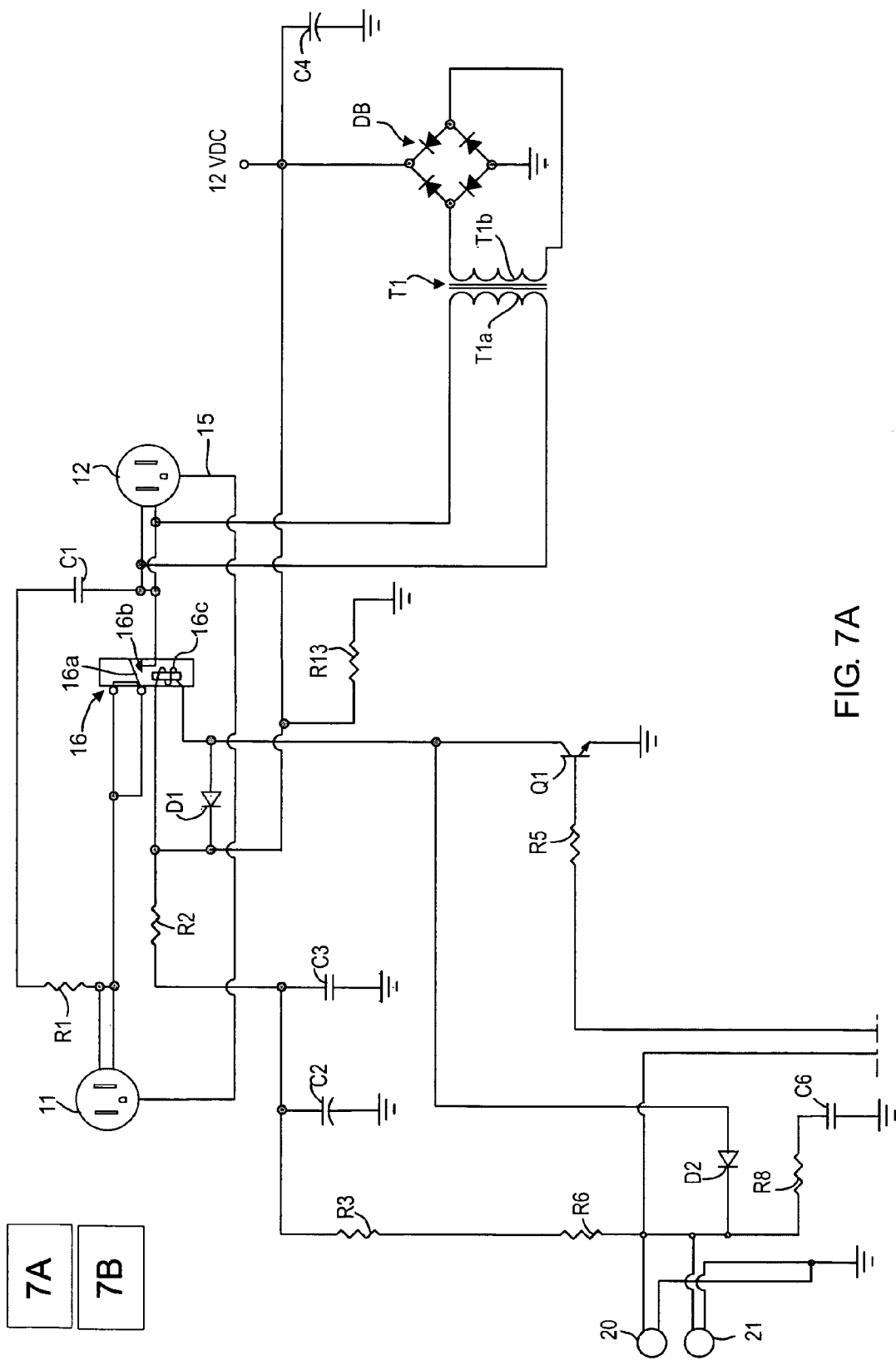
FIGS. 7a and 7b taken together form a single schematic circuit diagram of the electrical circuitry in the control unit of FIG. 5.
Figure 7B:
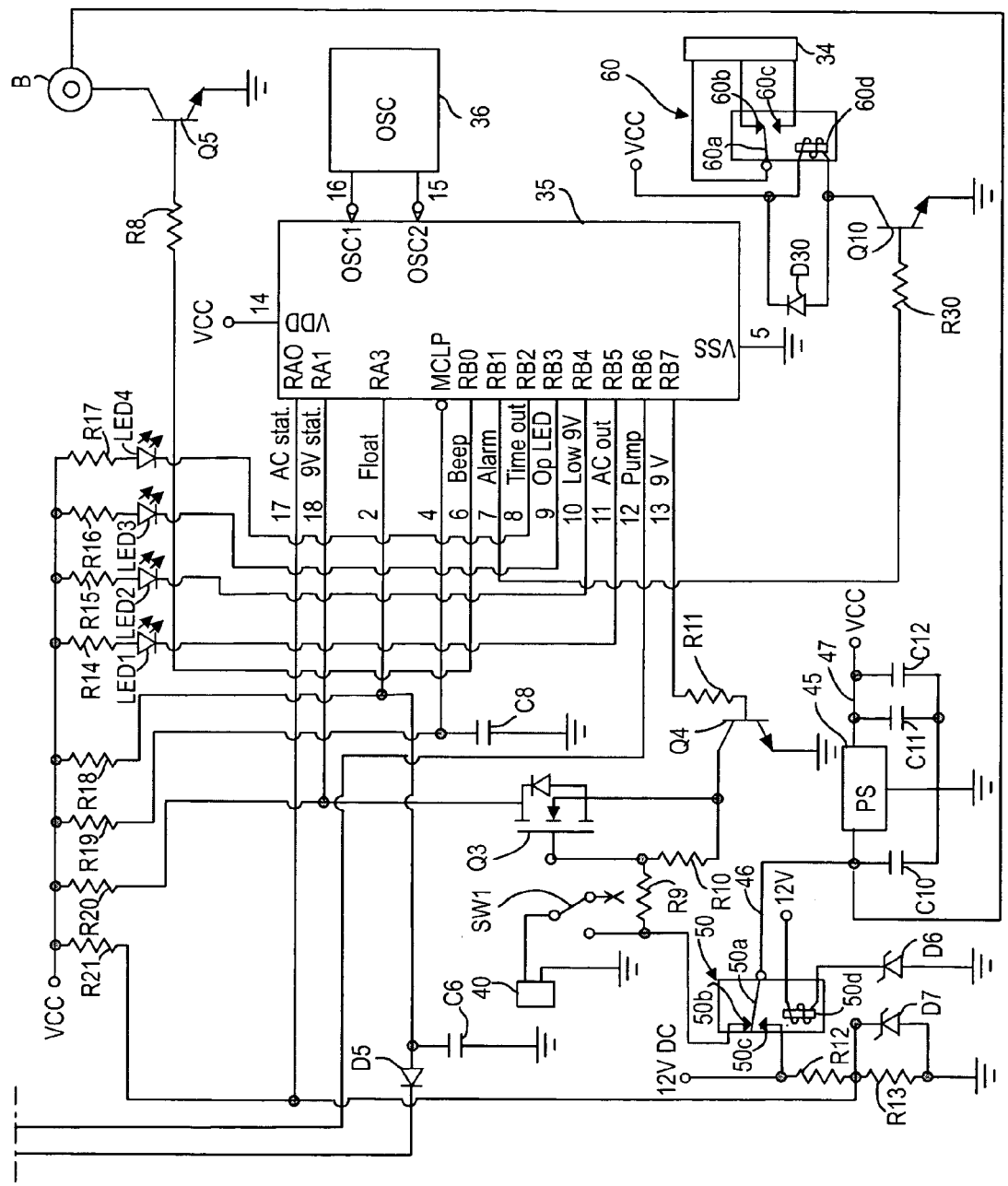
Figure 8:
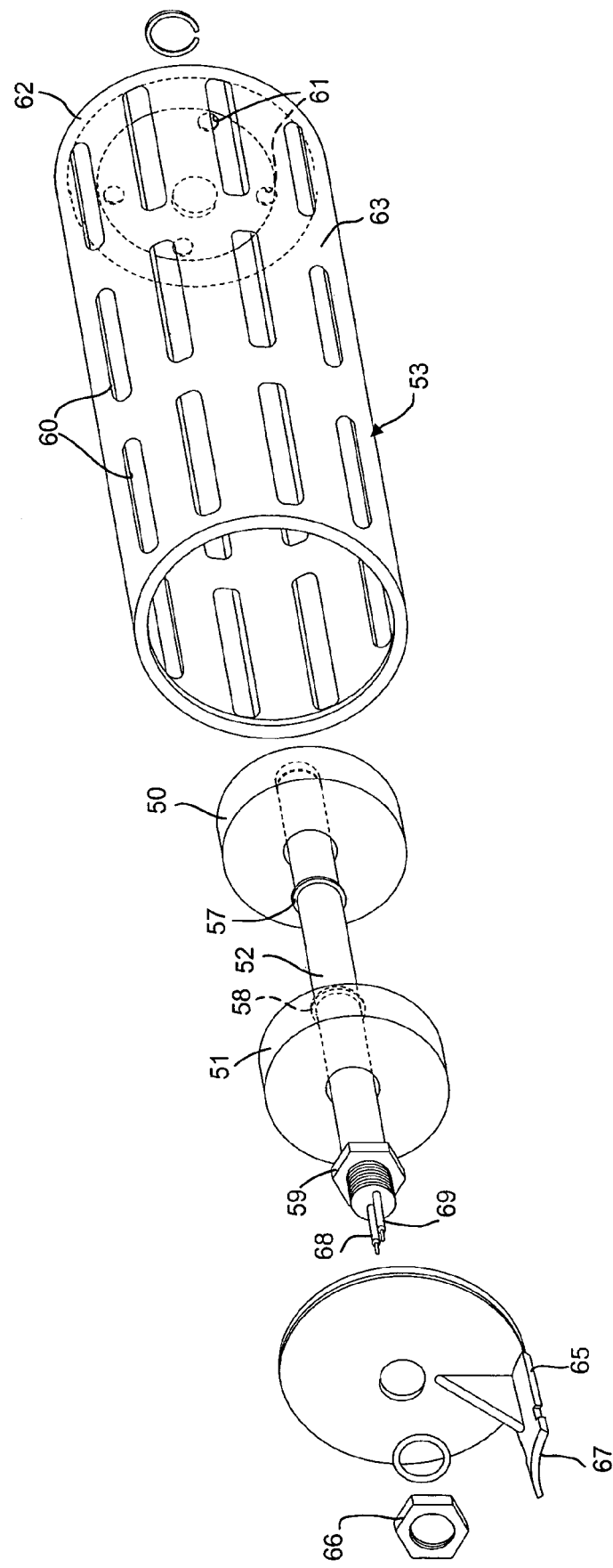
FIG. 8 is an exploded perspective of a float valve assembly for use with the control units of FIGS. 1-7.
Figure 12:
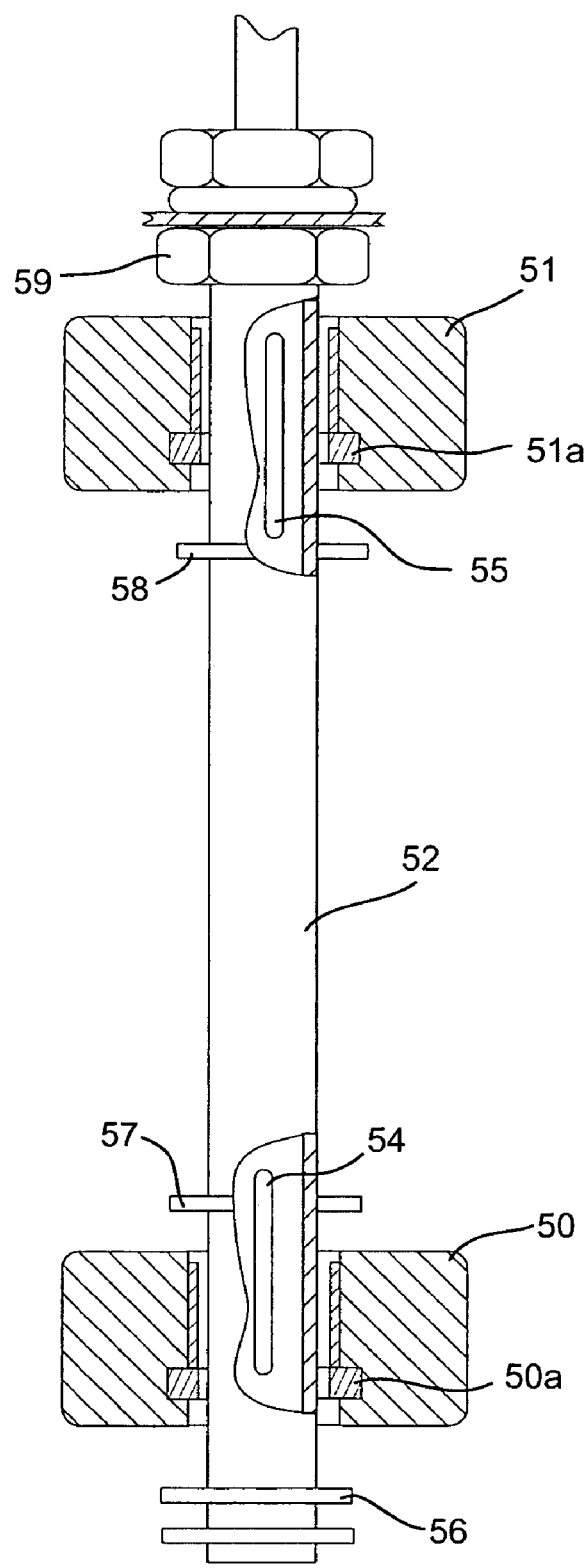
FIG. 12 is a longitudinal section of the floats and switches in the float valve assembly of FIGS. 8-11.

A schematic diagram of the control circuitry inside the housing 30 is shown in FIGS. 7a and 7b. Elements that are common to the control circuitry of FIG. 4 are identified by the same reference numbers in both figures, and the description of these common elements will not be repeated. The "float" output signals from the float switches 20 and 21 are supplied through a blocking diode D5 to pin 2 of a microprocessor 35 (e.g., a Microchip 16C54C powered by an internally derived 5-volt DC supply, described below. The diode DS blocks the 12 volts that is applied to the float switches, to protect the microprocessor input. A resistor R18 connected between the "float" signal line and Vcc is a 5V pull-up for the "float" input to pin 2 of the microprocessor 35. A capacitor C6 connected between the diode D5 and ground provides a noise filter to remove noise on the line connecting the float switches to the microprocessor 35. A diode D4 is connected between the float switches and the collector of the transistor Q1 is a pump fail-safe diode that turns on the pump in the event of a failure of the microprocessor 35. The "float" signal is one of three inputs to the microprocessor 35; the other two are "AC status" and "9V status" signals supplied to pins 17 and 18, respectively.

The "AC status" signal is the voltage level at the midpoint of a voltage divider formed by a pair of resistors R12 and R13 connected between the 12-volt supply and ground. This "AC status" voltage is supplied to pin 17 of the microprocessor 35 and goes low when power is not available from the AC power line (because the 12-volt supply is derived from the AC power supply) or when a brown-out (e.g., line voltage drops below a preselected voltage such as 90 volts). A resistor R21 is a pull-up for the "AC status" line to pin 17. A zener diode D7 is connected across the resistor R13 to limit the voltage to a maximum of 5.1V into the pin 17.

The "9V status" signal is produced by a circuit that monitors the output voltage of a 9-volt backup battery 40 that can be connected to the control circuitry by a switch SW1. The monitoring circuit includes a FET Q3, such as a 2N7000 which is an N-channel enhancement-mode vertical DMOS FET, whose output (drain) is the "9V status" input to pin 18 of the microprocessor 35, which goes low to produce an alarm signal when the output voltage of the battery drops below a preselected level, indicating that the battery should be replaced or re-charged. A resistor R20 connected between pin 18 and Vcc is a pull-up for the "9V status" input to pin 18. The gate of the FET Q3 is connected to the midpoint of a voltage divider formed by a pair of resistors R9 and R10 connected between the ground side of the switch SW1 and the collector of a transistor Q4. The emitter of the transistor Q4 is connected to ground, and the base is connected via resistor R11 to the "9VC" output at pin 13 of the microprocessor 35, which turns on the battery-voltage-monitoring circuit. The "9VC" signal from the microprocessor 35 turns on the transistor Q4 for a very short period of time (just long enough to measure the battery voltage and release) every 1 to 5 seconds. Each time the transistor Q4 is turned on, the FET Q3 supplies the microprocessor 35 with an "AC status" signal that is proportional to the current output voltage of the battery.

The microprocessor 35 uses the three input signals "float," "AC status" and "9V status" to produce the following output signals:

1. a "beep" signal that activates a beeper B whenever an alarm condition exists, indicating that the user has been notified and some action may be necessary, 2. a "time out" signal that illuminates the light-emitting diode LED4 whenever the pump motor remains on for a preselected time period, such as 5, 10 or 15 minutes, indicating that the liquid level in the sump has remained high for an abnormally long time, 3. an "operation" signal that illuminates the light-emitting diode LED3 to indicate that the controller is functioning and ready to receive signals from the monitoring system and/or the float switches.

4. a "low battery" signal that illuminates the light-emitting diode LED2 whenever the 9-volt backup battery voltage is low, indicating that the battery should be replaced or re-charged, 5. an "AC out" signal that illuminates a light-emitting diode LED1 whenever the AC power is out, indicating that the sump pump will not be able to operate until power is restored, and The "beep" output signal from pin 6 of the microprocessor 35 is supplied to the base of a transistor Q5 via resistor R8. A beeper B is connected in the emitter-collector circuit of the transistor Q5 so that whenever the transistor Q5 is turned on by the "beep" signal, the beeper B is activated by current flow from a low-voltage (e.g., 12 volts) power supply 40 through the beeper B and the transistor Q5 to ground.

For the "time out" signal, the microprocessor 35 starts measuring a preselected time interval (e.g., 10 minutes) when the signal from the float switches 20 and 21 indicates that the liquid level in the sump has risen to a level high enough to close the float switches, which is when the pump drive motor is turned on. At the end of the preselected time interval, if at least one of the float switches is still closed (motor is still running), the microprocessor produces the "time out" signal on pin 8 to illuminate LED4, and an "alarm" signal on pin 7. This "alarm" signal is discussed in detail below. If the liquid level in the sump drops before the end of the preselected time interval, the float switches open, terminating the input signal to the microprocessor, and the microprocessor then terminates the measurement of the preselected time interval in progress at that time.

For the "operation" signal, the microprocessor generates a signal at pin 9 to turn LED3 on and off once each second. Thus, the flashing of LED3, due to being repetitively turned on and off, indicates that the microprocessor is operational.

For the "low battery" signal, the microprocessor monitors the "battery status" signal from the timed battery-voltage-monitoring circuit (FET Q3) and generates the "low battery" signal at pin 10 to illuminate LED2 whenever the "9V status" signal indicates that the battery voltage has dropped below approximately 7.6 volts.

For the "AC out" signal, the microprocessor monitors the "AC status" signal from the voltage divider formed by resistors R12 and R13 and generates the "AC out" signal at pin 11 to activate the beeper B and illuminate LED1 whenever the "AC status" signal indicates that the AC power is out.

The 5-volt DC power supply Vcc is produced by an integrated circuit 45 such as an LM7805 which receives its input on line 46 from either the 12-volt supply or the backup 9-volt battery 40 and produces a regulated 5-volt output Vcc on line 47. To smooth out any noise present in the input to the integrated circuit 40, a capacitor C10 is connected between the input line and ground, and a pair of capacitors C11 and C12 are connected between the output line 47 and ground.

The backup battery 40 is typically a 9-volt battery that is used to maintain the 5-volt Vcc supply whenever the AC power is out. This maintains the operation of the microprocessor 35, the beeper B and the various LED's controlled by the microprocessor output signals. In the illustrative embodiment, the battery 40 is connected to the integrated circuit 45 via the slide switch SW1 and the contacts of a relay 50. The switch SW1 allows the user to disconnect the battery 40 after an AC outage has been signaled by the beeper B and LED1, to avoid any further drain no the battery. The relay 50 controls whether the integrated circuit 45 receives power from the backup battery 40 or the 12-volt supply derived from the standard AC power source. Normally, when AC power is available, the coil 50d of the relay 50 is energized because it is connected directly to the 12-volt supply, and the movable contact 50a of the relay 50 is in contact with the lower of two stationary contacts 50b and 50c, connecting the 12-volt supply as the power input for the 5-volt supply. When the AC power fails and interrupts the 12-volt supply, the coil 50d of the relay 50 is de-energized, causing the movable contact 50a to move into contact with the upper stationary contact 50b, connecting the battery 40 as the power input for the 5-volt supply. Thus, the 5-volt supply can continue to supply DC power Vcc to the microprocessor 35 and the various LED's until AC power is restored or the 9-volt battery fails or is turned off by moving switch SW1.

A zener diode D6 is connected in series with the coil of the relay 50 to allow the use of a 5-volt relay. The zener diode D6 is set for 8 volts, which ensures that the 5-volt relay 50 will switch from the 12-volt supply to the 9-volt battery when the 12-volt supply has dropped to about 10 to 11 volts, which indicates that the AC power has been terminated and the 12-volt supply is dropping fast.

A resistor R19 connected between pin 4 and Vcc is the pull-up for the reset circuit MCLR in the microprocessor, and in conjunction with a capacitor C8 resets the microprocessor 35 on powerup.

Light-emitting diodes LED1-LED4 are supplied with power from Vcc via respective resistors R14-R17. The output signals from the microprocessor 35 control the respective voltage drops across LED1-LED4, thereby controlling their illumination.

The microprocessor 35 also produces an "alarm" output signal on pin 7 whenever (1) the AC power fails or (2) the pump has been running for a preselected time period (e.g., 10 minutes). That is, the "alarm" signal is produced whenever LED1 or LED4 is illuminated. Either of these conditions can result in an overflow of the sump, either because the pump is no longer operating because of a power outage (indicated by the "AC out" signal), or because a blockage has prevented the pump from lowering the liquid level in the sump after the pump has been running for a period normally sufficient to lower the liquid level in the sump to the level at which the pump would be turned off (indicated by the "timeout" signal). The "alarm" signal produced when either of these conditions exists may be used to activate an alarm system, which may be an alarm system installed in the building in which said sump pump is installed or any security system capable of receiving such a signal via a communication link.

The "alarm" signal produced at pin 7 of the microprocessor is supplied through a resistor R30 to the base of a transistor Q10 to control the supply of power to a relay 60 whose state is monitored by an alarm system. The coil 60d of the relay 60 is connected in parallel with a diode D30 in the emitter-collector circuit of the transistor Q10 so that whenever the transistor Q10 is turned on by the "alarm" signal, the coil 60d is de-energized by current flow from the low-voltage power supply Vcc through the coil 60d and the transistor Q10 to ground.

The relay 60 has a movable contact 60a that is normally in contact with a first stationary contact 60b, but is moved to a second stationary contact 60c when the coil 60d is de-energized. The movable contact is connected to the common line of an alarm system via terminal 34a of the three-terminal connector 34 accessible on the front panel of the control unit (FIG. 5). The two stationary contacts 60b and 60c are connected to the other two terminals 34b and 34c, respectively, of the connector 34. Alarm systems typically can monitor either a normally closed or a normally open state, and thus the second line of the alarm system can be connected to either the normally closed contact 60b via terminal 34b, or the normally open contact 60c via terminal 34c. In either case, the alarm system will detect a change-of-state in the relay 60 and activate the appropriate alarm to notify the user of the alarm system that either a power failure has occurred or the sump pump has been running too long, so that remedial action can be taken.

A standard crystal oscillator 36 is connected to pins 15 and 16 of the microprocessor 35.

FIGS. 8-12 illustrate a dual-float-switch arrangement that can be used with either of the two embodiments described above. This dual-float-switch arrangement is mounted within a sump to detect changes in the water level within the sump. Two annular floats 50 and 51 containing respective magnets 50a and 51a are mounted for sliding movement on a central vertical tube 52 extending longitudinally through a cage 53. The magnets 50a and 51a cooperate with respective reed switches 54 and 55 mounted inside the tube 52 to open and close the switches in response to movement of the magnets along the tube 52. Specifically, the lower float 50 can move between a pair of retaining rings 56 and 57 affixed to the tube 52. The normal position of the float 50 is its lowermost position resting on the lower retaining ring 56, which is the position of the float 50 and its magnet 50a when the water level in the sump is at a desired low level. When the water level rises, the float 50 slides upwardly along the tube 52 until the top of the float engages the upper retaining ring 57. As the float moves upwardly, its magnet 50a causes the corresponding reed switch 54 to close, thereby producing a signal that can be used to turn on the sump pump. When the water level drops, the float 50 moves downwardly, causing the reed switch 54 to open and thereby produce a signal that can be used to turn off the sump pump.

The upper float 51 and its magnet 51a and corresponding reed switch 55 operate in the same manner as the lower float 50, magnet 50a and switch 54. Thus, the normal position of the float 51 is its lowermost position resting on its lower retaining ring 58. When the water level rises, the float 51 slides upwardly along the rod 52 until the top of the float engages its upper retaining ring 59. As the float 51 moves upwardly, its magnet 51a causes the corresponding reed switch 55 to close, thereby producing a signal that can be used to turn on the sump pump. When the water level drops, the float 51 moves downwardly, causing the red switch 55 to open and thereby produce a signal that can be used to turn off the sump pump.

The operation of the two float switches is redundant except for the fact that the upper float 51 and switch 55 respond to a slightly higher water level than the lower float 50 and switch 54. Thus, in the event that the lower float 50 becomes obstructed, such as by the lodging of a solid object between the upper surface of that float and its upper retaining ring 57, the upper float 51 will still move upwardly and activate its reed switch 55 to turn on the sump pump, thereby providing a backup for the lower float switch.

The cage 53 helps to prevent solid materials in the sump water from gaining access to the floats 50 and 51, thereby reducing the possibility of obstructions blocking the movement of either magnet. The cage 53 forms multiple elongated openings 60 that allow water to freely enter the interior of the cage and cause the magnets to float, but the relatively narrow horizontal dimension of the openings 60 causes them to act as a filter or sieve that prevents solid materials larger than that dimension from entering the cage and obstructing movement of the floats 50 and 51.

Multiple holes 61 are formed in the bottom wall 62 of the cage 53 to allow small solids to exit the cage through its bottom wall 62 so that they do not accumulate inside the cage. In addition, the central portion of the bottom wall 62 is raised so that the wall slopes downwardly from its center to its outer periphery where it joins the vertical side wall 63 of the cage. This incline tends to promote the flow of small solids out to the side wall of the cage where such solids can exit the cage through the multiple side-wall openings 60.

To facilitate mounting of the entire dual-float-switch assembly on the discharge pipe that typically extends upwardly through a sump from the discharge nozzle of the sump pump, a mounting bracket 65 is formed as an integral part of the upper end wall of the cage 53. The bracket 65 is secured by a nut 66 attached to the threaded upper end of the tube 52. The bracket forms a vertical flange 67 that is curved to match the curvature of the outside surface of a typical sump discharge pipe, so that the bracket 65 can be attached to such a pipe with a standard hose clamp.

The dual-float-switch assembly of FIGS. 8-12 is preferably connected to the control unit of FIGS. 1-4 or FIGS. 5-7 by a pair of electrical leads 68 and 69 connected to the switches 54 and 55 via the central tube 52. The dual-float-switch assembly and the pump may be mounted in different locations within the sump, being coupled to each other only through their respective electrical connections to the control unit mounted above the sump. Separating the activation switches from the pump allows installations where it may be beneficial for the pump to be submerged in many feet of water before the water rises to a level where the pump is turned on to begin pumping water out of the sump.

The dual-float-switch assembly of FIGS. 8-12 may also be used with DC pump systems, which typically detect continuity at the reed switches. A pair of the dual-float switch assemblies may also be used with a pair of pumps driven by AC and DC drive motors, with the DC pump being used as a backup for the AC pump. The AC pump system can be the same as described above. The DC pump can have its dual-float-switch assembly mounted at an elevation above that of the AC pump, so that if the AC pump does not turn on (e.g., because of a power failure), or if the sump takes in water at a rate faster than the discharge rate of the AC pump, the water level will continue to rise and cause the second dual-float-switch assembly to turn on the DC pump. In one embodiment of this dual-pump system, the two pumps are pre-coupled so that they can be installed as a single unit having a common discharge port so that only one connection need be made to the discharge line during installation.

When the present invention is applied to sump pumps used in sewage pits, it may be desirable to use one of the conventional float-switch arrangements that are commonly used with sump pumps for such applications. In that case, a current sensor may be used to monitor the level of current flowing in the power line to the drive motor of the pump, to supply the microprocessor with a signal indicating when the pump is operating. The current sensor may be hard-wired into the power line to the pump motor, or the current can be monitored by detecting the field surrounding the power line. The microprocessor can then use the signal from the current sensor to determine the run time of the pump drive motor, and generate the desired "timeout" and "alarm" signals at pins 8 and 7, respectively, when the pump has been operating continuously for a preselected time interval.

The invention claimed is:

1. A control system for a sump pump driven by an AC motor, comprising
    an AC power line having an input adapted for connection to an AC power source and an output adapted for connection to said drive motor for energizing said drive motor,
    a controllable switch in said AC power line,
    a controller coupled to said controllable switch to supply a control signal to said switch to control the opening and closing of said switch, and
    redundant float switches each of which is coupled to said controller and adapted to be mounted in a sump to supply said controller with a signal when the liquid in said sump rises to a selected level.

2. The control system of claim 1 which includes a transformer connected to said AC power source to step down the voltage of said AC power source, and a rectifier connected to said transformer to receive said stepped down voltage and convert it to a DC power supply for said controller.

3. The control system of claim 1 which includes a timer in, or coupled to, said controller to alter said control signal to actuate said controllable switch if the liquid level in said sump remains above said selected level for a preselected time period.

4. The control system of claim 1 wherein said controller produces said control signal to cause said controllable switch to energize said drive motor in response to said signals from said float switches.

5. The control system of claim 1 wherein each of said float switches also supplies said controller with a signal after the liquid level in said sump drops below a selected level.

6. The control system of claim 5 wherein said controller produces said control signal to cause said controllable switch to open to de-energize said drive motor a predetermined time after the liquid level in said sump drops below a selected level.

7. The control system of claim 1 wherein said controller includes a microprocessor receiving said signals from said float switches.

8. The control system of claim 7 wherein said microprocessor produces an alarm signal when said pump drive motor remains energized for a predetermined time.

9. The control system of claim 7 which includes a backup battery coupled to said microprocessor, and wherein said microprocessor produces an alarm signal when the battery voltage drops below a preselected level.

10. The control system of claim 7 wherein said microprocessor is coupled to said AC power line and produces an alarm signal when the voltage on said power line drops below a preselected voltage.

11. A control system for a sump pump driven by an AC motor, comprising
    an AC power line having an input adapted for connection to an AC power source and an output adapted for connection to said drive motor for energizing said drive motor,
    a controllable switch in said AC power line,
    a controller coupled to said controllable switch to supply a control signal to said switch to control the supply of power to said drive motor,
    at least one float switch coupled to said controller and adapted to be mounted in a sump to supply said controller with signals when the liquid in said sump rises to a selected level, and when the liquid in said sump drops below said selected level, and
    a timer responsive to the supply of power to said drive motor for producing an alarm signal when said drive motor has been energized continuously for a preselected time period, said preselected time period being independent of the amount of current through said motor.

12. The control system of claim 11 which includes redundant float switches each of which is coupled to said controller and adapted to be mounted in a sump to supply said controller with signals when the liquid in said sump rises to a selected level, and when the liquid in said sump drops below said selected level.

13. A control system for a sump pump driven by an AC motor, comprising
    an AC power line having an input adapted for connection to an AC power source and an output adapted for connection to said drive motor for energizing said drive motor,
    a controllable switch in said AC power line,
    a controller coupled to said controllable switch to supply a control signal to said switch to control the supply of power to said drive motor,
    a power supply for supplying said controller with power derived from said AC power line,
    at least one float switch coupled to said controller and adapted to be mounted in a sump to supply said controller with signals when the liquid in said sump rises to a selected level, and when the liquid in said sump drops below said selected level,
    a backup battery for supplying power to said controller when power is not available from said AC power line, and
    a monitor coupled to said backup battery for producing an alarm signal when the output voltage of said battery drops below a selected level.

14. The control system of claim 13 which includes a monitor coupled to said AC power line for producing a battery control signal when power is not available from said AC power line, and a controllable switch responsive to said battery control signal for connecting said battery to said controller.

15. The control system of claim 13 which includes a connector for supplying said alarm signal to an alarm system.

16. A method of controlling a sump pump installed in a sump and driven by an AC drive motor, comprising
    supplying said drive motor with power from an AC power source via a controllable switch for controlling the energization of said drive motor,
    detecting the liquid level in said sump with redundant float switches mounted in said sump and producing signals when the liquid in said sump rises to a first selected level and when said liquid falls to a second selected level, and
    supplying a control signal to said controllable switch to control the opening and closing of said switch in response to said signals produced by said float switches.

17. The method of claim 16 which further includes producing an alarm signal when said drive motor has been energized continuously for a preselected time period.

18. The method of claim 16 which further includes supplying said control signal from a controller, supplying power to said controller from a backup battery when power is not available from said AC power source, and producing an alarm signal when the output voltage of said backup battery drops below a preselected level.

19. The method of claim 16 which further includes producing an alarm signal when the voltage on said power line drops below a preselected voltage.

20. The method of claim 16 which includes mounting said pump and said redundant float switches are mounted within said sump, the positions of said float switches within said sump being independent of the position of said pump within said sump.

* * * * *